Figure 1:
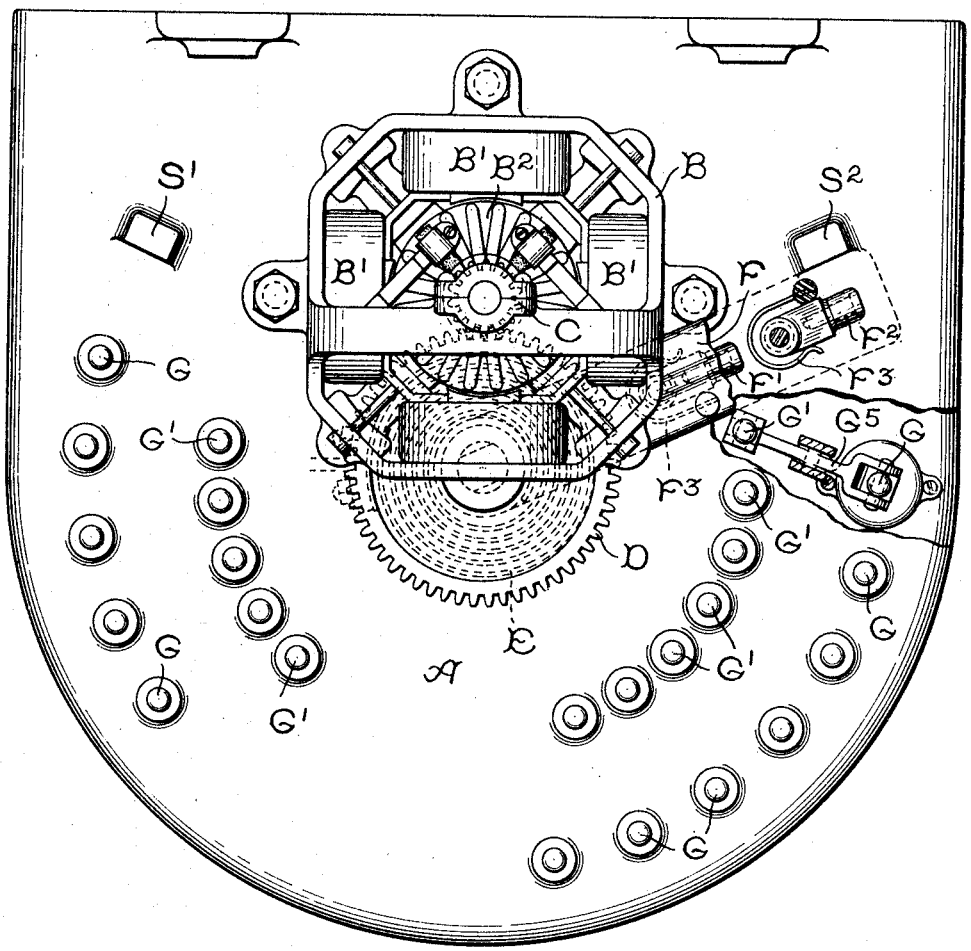

No. 617,601. Patented Jan. 10, 1899.
W. B. POTTER.
SYSTEM OF CONTROL FOR ELECTRIC MOTORS AND RAILWAY TRAINS.
(Application filed Mar. 17, 1898.)
(No Model.) 5 Sheets—Sheet 1.

WITNESSES:
A. H. Abell.
A. F. Macdonald.

INVENTOR.
William B. Potter, by
Albert G. Davis
atty

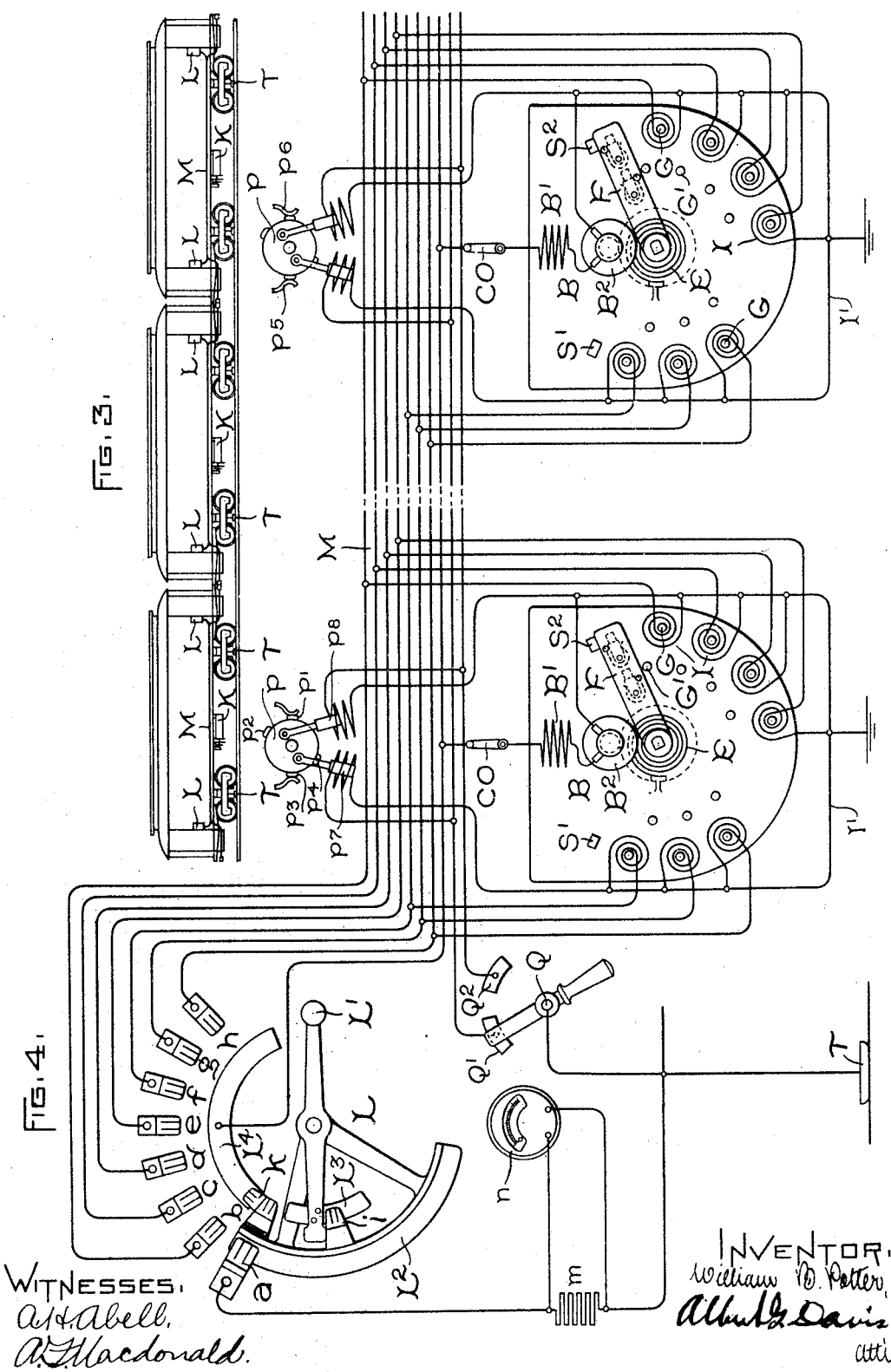

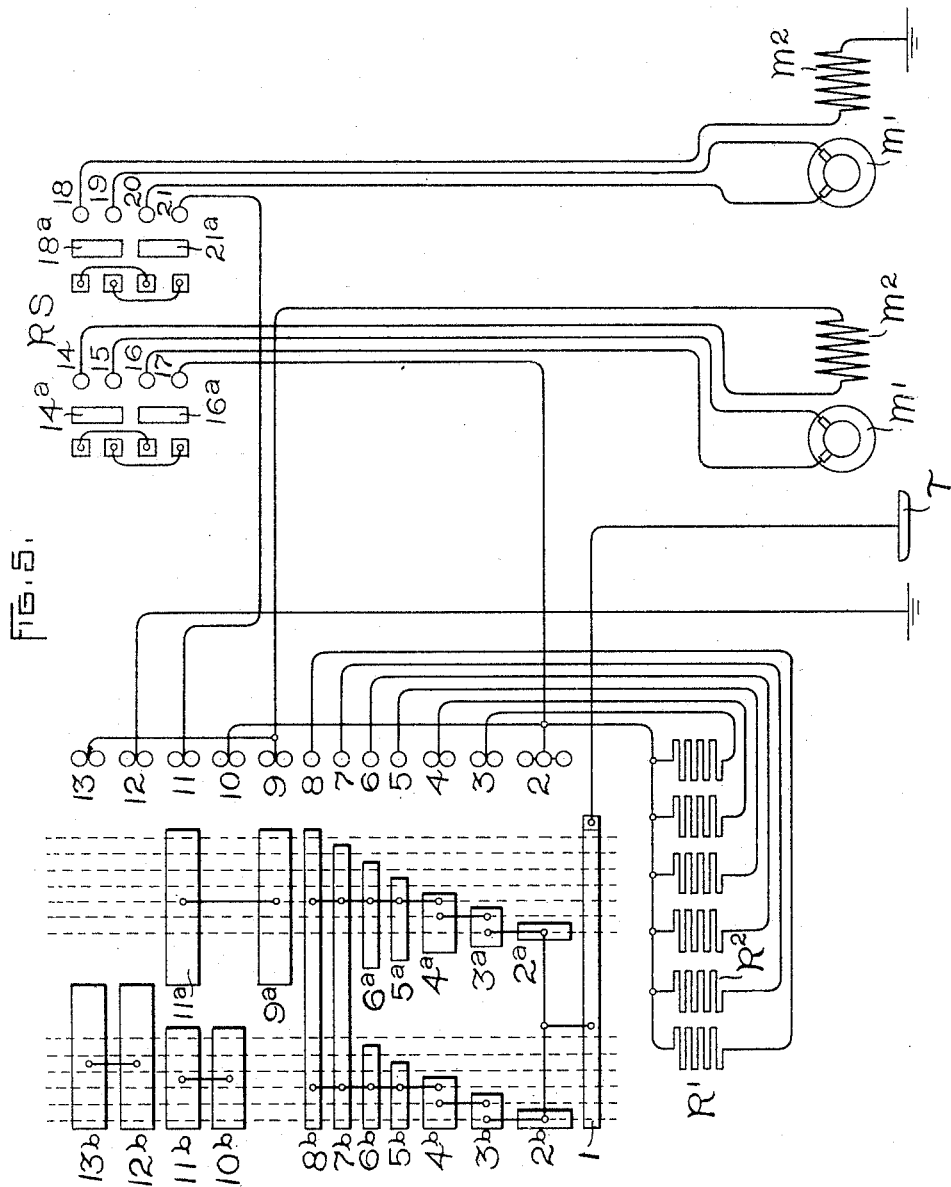

No. 617,601. Patented Jan. 10, 1899.
W. B. POTTER.
SYSTEM OF CONTROL FOR ELECTRIC MOTORS AND RAILWAY TRAINS.
(Application filed Mar. 17, 1898.)
(No Model.) 5 Sheets—Sheet 4.
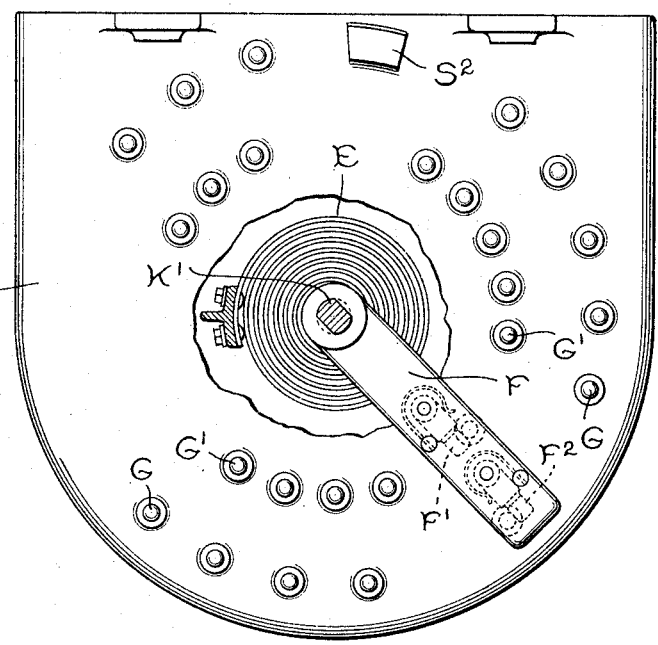
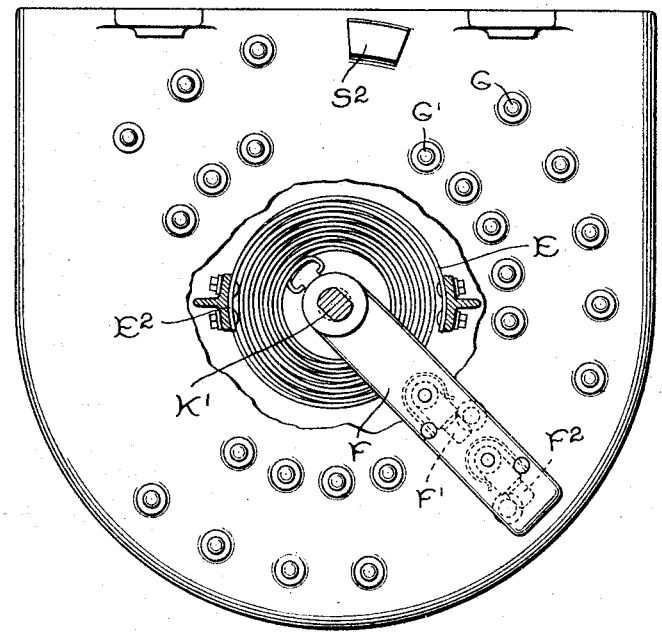
Witnesses:
A. H. Abell.
A. T. Macdonald.
Inventor:
William B. Potter, by
Albert G. Davis
Atty.

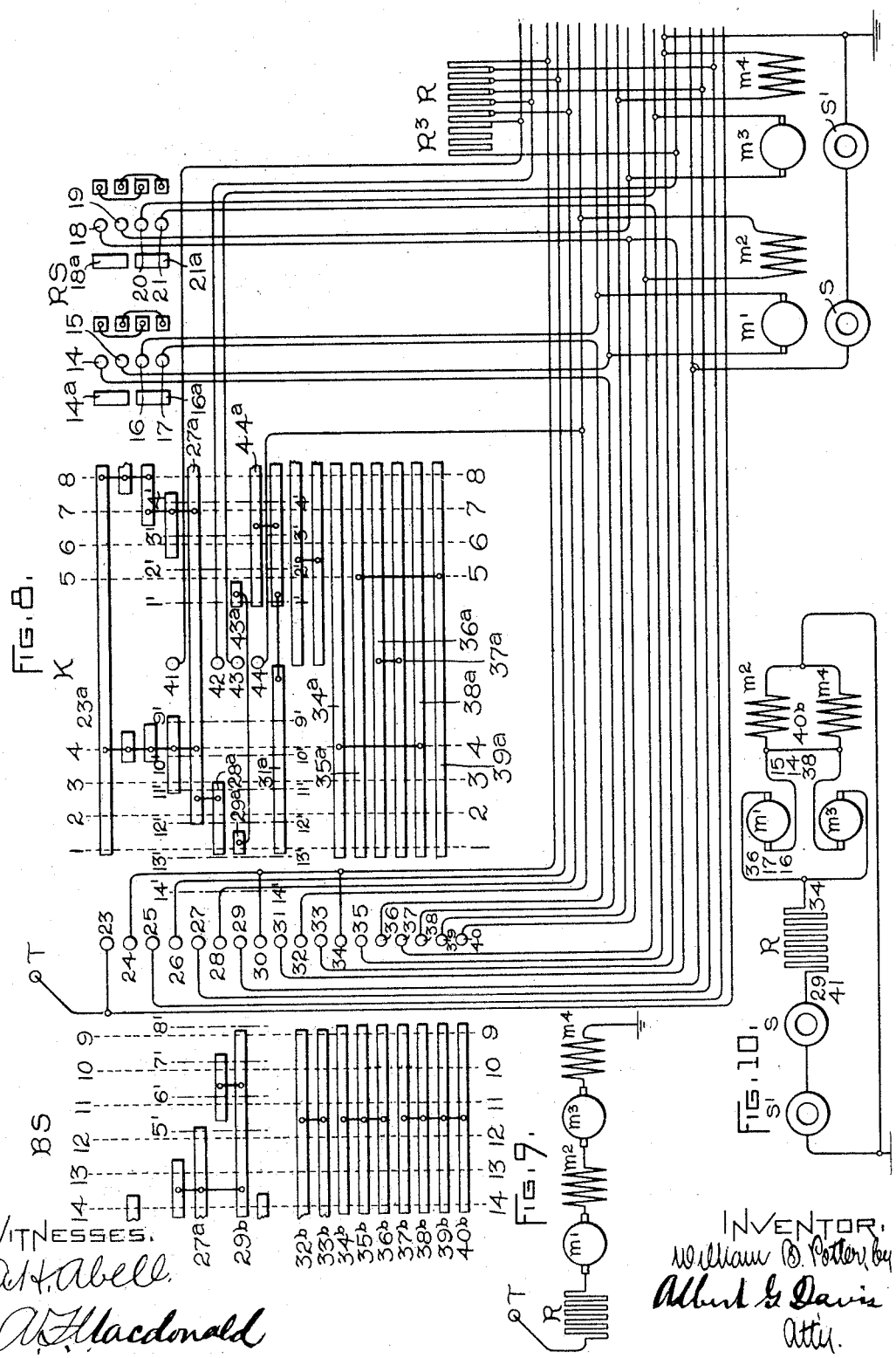

United States Patent Office.

WILLIAM B. POTTER, OF SCHENECTADY, NEW YORK, ASSIGNOR TO THE GENERAL ELECTRIC COMPANY, OF NEW YORK.

SYSTEM OF CONTROL FOR ELECTRIC MOTORS AND RAILWAY-TRAINS.

SPECIFICATION forming part of Letters Patent No. 617,601, dated January 10, 1899.

Application filed March 17, 1898. Serial No. 674,190. (No model.)

*To all whom it may concern:*

Be it known that I, WILLIAM B. POTTER, a citizen of the United States, residing at Schenectady, county of Schenectady, State of New York, have invented certain new and useful Improvements in Systems of Control for Electric Motors and Railway-Trains, (Case No. 576,) of which the following is a specification.

My invention relates to systems of control for electric motors, and is particularly useful in connection with such as are used in railway-trains in which a number of individual propelling-units employing one or more motors are so connected that while each furnishes its share of energy for the propulsion of the train all may be controlled from a single point. In such systems I find it highly advantageous to provide the motors upon each car of the train with a separate controlling device, preferably of the series-parallel type, though other arrangements may be used. Since the simultaneous manual actuation of a number of different controllers thus located is practically impossible, I have devised a simple system of control by which all of the regulators or controllers upon the different cars may be simultaneously and synchronously actuated by power—as, for example, by the electric current which propels the train and controlled from a selected point.

My invention therefore contemplates the use of a number of motor-controllers or controlling devices and one or more master-controllers, each capable of controlling the action of a number of motor-controllers. Such a system is chiefly applicable to motor-vehicles, and particularly when a number of such cars are united to form a train, though it is also useful in other connections. I find it essential that the connections between the master and motor controllers should be more positive than is possible with the step-by-step devices used in connection with electric indicators and similar work.

My invention therefore aims to provide an arrangement whereby any movement of the master-controllers of any magnitude and in either direction will be followed by a corresponding movement of all of the motor-controllers governed thereby. Further, I aim to provide an arrangement by which the various changes in the resistance and arrangement of the motor-circuits take place at a rate of speed under the control of the motorman up to a certain point only, but beyond that point automatically maintained at a certain fixed maximum, whereby the too sudden starting of the motors is prevented.

My invention also comprises a new and improved arrangement for retarding or controlling the retardation of the car or train, such that the braking effect as well as the accelerating effect of an entire train of cars may be controlled by simple electromagnetic means operated from a single point.

My invention also includes certain improvements in telemotric control and various methods and combinations to be hereinafter more fully described and claimed.

In each of the controlling devices it is preferable to provide definite points at which the device will rest for such times as the motorman may wish. I may accomplish this result by driving each of the motor-controllers by a source of power controlled by the master-controller and providing a set of electrically-controlled stops, acting to check each of the individual motor-controllers at a position defined by the position of the master-controller. For this purpose I prefer to employ a set of stops which may be withdrawn by the action of the electric current. All of those of similar positions in the different controllers are preferably connected in a common circuit, so that they are simultaneously actuated. As the stops are successively withdrawn the cylinder of each controller advances under the action of the source of power above mentioned, which source of power is preferably a small electric motor mounted at or near each motor-controller, until finally the highest speed position of the controllers is reached. For resisting the action of the motors I provide suitable springs, which have sufficient strength to rotate the controllers backward when the current is shut off from the small motors. It is of course within my invention do away with the springs by reversing devices of any kind applied to the small motors. The spring, however, has some advantages, among others being the fact that if for any reason the current fails the controllers are all brought to the off position, in which the train-circuit is dead, thus forming a useful safety device and preventing an accident on the sudden restoration of the current.

I have illustrated embodiments in my invention in the accompanying drawings, in which—

Figure 2:
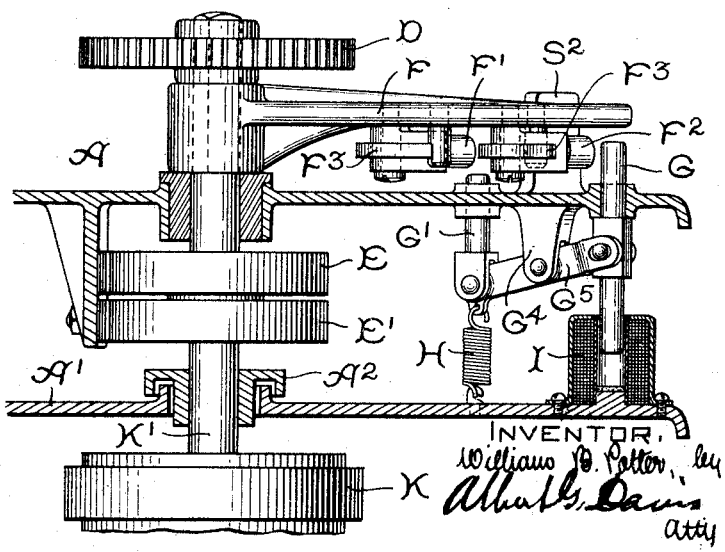

Figure 1 is an end elevation of the motor-controlling device, which is preferably placed under each motor-car. Fig. 2 is a detail, partly in section, of the parts shown in Fig. 1. Fig. 3 is a diagrammatic side elevation of a train equipped with my invention. Fig. 4 is a diagram of circuits with a controlling device for actuating all the motor-controllers; and Fig. 5 is a diagram of the controller-circuits by means of which the propelling-motors of the train are driven, while Figs. 6 and 7 are end views, and Fig. 8 is a diagram, of the circuits of a "brake-controller" system.

In Figs. 1 and 2, A is a plate forming at once a cover and a support for the operating parts of the controller, and B is the governing-motor, geared to the controller-shaft by the reducing-gears C D. The field-magnet coils are shown at B' and the armature at B². The governing-motor is of any well-known form and is preferably series-wound.

E E' are the springs acting to restore the controller to zero. With the ordinary rheostatic or series-parallel controller only one spring need be used. Where, however, the controller is designed for operation in two different directions, as is commonly the case in controlling devices in which electric-brake circuits are embodied, the two springs may be wound in opposite directions and will then tend to restore the controller-cylinder to zero or to the off position in whichever direction it is moved by the motor. These springs, as already pointed out, are of sufficient strength not only to overcome the friction of the controller-contacts, but also to rotate the motor when the current is cut off.

F is an arm upon the controller-shaft, provided with two pawls F' F², the pawls being controlled by springs F³ F³. The arm rests in the off position against the stop S², and a similar stop S' is provided on the other side of the controller to limit its movement in that direction.

It will be observed that the pawl F² is free to move only to the right or downward, as shown in Fig. 1, and that the pawl F' may move only in the opposite direction. Projecting through the cover A are two sets of reciprocating pins, lettered, respectively, G and G'. Each pin G is connected to one of the pins G' by a lever or link G⁵, bearing in a lug G⁴, which projects from the cover A. Retracting-springs H tend to keep the pins G' below the path of the pawls F'. Solenoids I are provided, which, when energized, act to withdraw the pins G from the path of the pawl F² and at the same time to raise the pins G' into the path of the pawl F'. It will be noted that on one side of the controller there are seven of these stops or step-by-step devices and on the other side five, while between the sets is a blank space. A well-known form of series-parallel controller is illustrated as the one employed, the pins on one side representing the series positions with their resistances and those on the other side the multiple positions, while the blank space is the transition-point from series to multiple, upon which the controller is not supposed to stand. In Fig. 2 will be seen another plate A', forming a cover for the controller, and a bushing A² around the shaft K' of the controller-cylinder K itself, of which only the upper portion is shown.

Fig. 3 shows a train in diagram, having a motor-controller K and two master-controllers L on each car, which is the preferred arrangment, though not essential. A cable M is shown connecting the various pieces of apparatus. The system of supply illustrated is the now well-known third-rail system, and the contact-shoes T are shown on the trucks of the train between the wheels.

Fig. 4 is a diagram of the circuit connections, showing one master-controller and two motor-controllers wired to the cable M.

The main switch L of the master-controller is shown as consisting of a number of fixed contacts $a$ $b$ $c$ $d$, &c., over which sweeps a movable sector L². The sector is driven by the arm L' through a lost-motion device and carries the contact $i$ and the insulated brush $k$. The contact $a$ is connected to line through the shunt $m$ of the ammeter $n$.

The contacts $b$ to $h$, inclusive, of the master-controllers are connected in multiple to the wires composing the train-cable M, and in circuit between these wires and the ground-wire L' are the solenoid-coils I.

In the position shown in Fig. 4 current enters from the trolley or shoe T, and passing through the resistance $m$ and indicating by its proportionate reading on the ammeter $n$ the flow of current goes first to the contact $a$, and thus to the larger sliding contact-sector L² on the controller L. The circuit is still open, however, the contact $k$ being insulated from contact L². If the arm L' is thrown in a right-handed rotation until L³ touches $k$, current flows to the contact L⁴ and directly to the small series motors B B and to ground. The arms F of all the motor-controllers are thus actuated until they touch the pins or studs G, as in Fig. 2, which are projected through the case to stop them. At the next step of the switch L the contact $b$ is put in circuit, and the first of the pins G is withdrawn by its corresponding solenoid. As the motors B B are still supplied with current the controller-arms are now brought against the second of the pins G. As the first pin G is retracted the corresponding pin G' is thrown up and acts to prevent the arms F F of the controllers from being brought back to the off position by any accident except one which would deprive the motors of current. Corresponding actions take place as the contacts $c$ to $h$ are touched, until finally the arms F are brought around against the stops S'. It will be observed that the pins G' offer no obstruction to the arm F while it is rotating toward full-speed positions, because the pawl F' is free to pass them, and, vice versa, the pins G offer no obstruction to the pawl $F^2$ as the controller returns to the off position.

The backward operation of the motor-controller arms through any desired angle is accomplished by moving the arm L' in a left-handed rotation until the sector $L^2$ assumes the position corresponding to the desired position of the motor-controllers. The action is as follows: The contact $L^3$ leaves the brush $k$ by virtue of the lost-motion connection, and the circuit of the motors B is at once opened, so that the springs E, Fig. 2, tend to return the arms F to the off position; but such motion is prevented by such of the stops G' as are elevated. Therefore the arms will return only to the position corresponding to the last one of the brushes $a\ b\ c$, &c., in contact with the segment $L^2$. It will then be seen that the motor-controllers may be actuated in absolute synchronism to any desired amount and in either direction by the action of a single master-controller. It is also obvious that any one of the master-controllers L shown in Fig. 3 may be used to accomplish the desired result.

To avoid unnecessary complications of the drawings, I have shown the motor and master controllers in Fig. 4 arranged for a less number of positions than that in Fig. 1; but it is evident that the number may be varied to suit any requirements.

The devices thus far described are evidently sufficient for throwing the ordinary series-parallel controller to any of its positions no matter how many points the controller may have; but it is also necessary or useful to throw a reversing-switch for determining the direction of motion of the cars, and one such reversing-switch is preferably attached to each motor-controller, as will be more fully shown hereinafter. Two of these switches are shown at P in Fig. 4, one corresponding to each of the motor-controllers. Each reversing-switch is shown as consisting of four sets of contacts $P'\ P^2\ P^3\ P^4$, arranged on a cylinder and capable of bearing two sets at a time against brushes $P^5\ P^6$. The position of each reversing-switch is controlled by two solenoids $P^7\ P^8$. The circuit connections to these solenoids are as follows: Starting from the shoe T a wire passes to the master reversing-switch Q. This switch is provided with two contacts $Q'\ Q^2$, from which wires lead, respectively, to the sets of solenoids $P^7\ P^8$. With the switch Q in the position shown current will pass from the contact-shoe through the solenoid $P^7$ and to ground, and the reversing-switches will be thrown to the position shown, which will be assumed to be the position corresponding to the forward motion of the train. With the switch Q on the contact $Q^2$ the solenoid $P^8$ will be energized and the reversing-switches will be thrown in the opposite direction.

In Fig. 5 I have shown a development of a suitable motor-controller and its connections. The controller operates on the well-known series-parallel principle by a series of steps, in which as the combination passes from series to parallel one of the motors is shunted, its circuit then opened, and finally it is connected in parallel with the other motor, resistance being cut in or out to facilitate these changes. The particular controller illustrated brings in resistance sections in multiple, so that as each section of resistance is cut in the total resistance of the circuit is lowered. The rotation of the controller is toward the right. The contacts 2 to 13 are stationary brushes of the usual type, while 1 is a trolley-contact permanently connected to the collector T, which is the collector already shown in Fig. 4. Contacts $2^a\ 2^b$, &c., to $8^b$ are resistance steps acting to cut in in multiple the resistances $R'\ R^2$, and thus to reduce the total resistance of the circuit. Contacts $9^a\ 11^a$ are the ordinary series contacts. $10^b$ to $13^b$ are the parallel contacts. Where the contacts $11^a\ 12^b$ overlap slightly, one motor is shunted. The circuit will be traced only through the series position, inasmuch as the other combinations are self-evident.

Starting from the shoe T, current passes to the trolley-contact 1, and thence through the various steps of resistance, however that may happen to be in circuit, to the lead connected to the brush 2, thence to the reversing-switch RS, by contacts 17 and 16 and $16^a$, through the armature M', by 15 and 14 and $14^a$, through the field $M^2$ of the first motor to contact 9, by cross connection to contact 11, thence through the contacts 18 to $21^a$ of the reversing-switch, and through the second motor to ground.

It will be evident that with the brushes 14 15, &c., of the reversing-switch RS bearing upon the left-hand side of the contacts the motors will be connected to run in the opposite direction. The change in the position of the reversing-switch is made by the switch Q of the master-controller, as above explained. This particular controlling device is illustrated simply as one adapted to the purposes of my invention and which may be applied to systems of train control such as I have referred to.

My invention also comprises an arrangement by which the motors may be accelerated, regulated, and retarded from a single point by the use of the apparatus thus far described in combination with some suitable electrically controlled or actuated braking device. For such work I prefer to use motor-controllers arranged as shown in Fig. 6 or in Fig. 7. The device shown in Fig. 6 is similar to that shown in Fig. 1, except in the arrangement of the stops G G'. The arm F, the stop S², the spring or springs E, &c., are left, as before, but the stops are arranged in three sets, corresponding, first, to the brake positions; second, to the series positions, and, third, to the multiple-power positions. The arm F is shown in the off position and tends naturally to be returned against the stop S² through the brake positions. With such an arrangement when the master-controller switch L is first closed the motor-controllers work through the brake positions to the off position and finally to the series position. They may obviously be retained on the off position by properly setting the switch L, and will remain there as long as current is supplied to the motors. On any momentary interruption of the current they will pass through the brake position, returning again to the off position when the current is restored.

The arrangement shown in Fig. 7 is identical in result, but different in arrangement. Two springs E and E² are used, working in opposite directions, so arranged that their combined action tends to bring the motor-controller to the off position, which is the position shown in the figure. The small motor which drives the controller is provided with a reversing-switch under the control of the master-controller, as will be obvious to one skilled in the art, and is thus capable of driving the motor-controller either right-handedly for power or left-handedly for brake by proper rotations of the switch L.

I have shown in Fig. 8 a diagram of motor-controller and motor-circuits arranged to be operated in connection with either one of the devices shown in Figs. 6 and 7. In this figure $m'$ $m^3$ are the armatures and $m^2$ $m^4$ are the field-magnets of the motors, while $s$ $s'$ are brake-shoes or other electrically controlled or operated brakes of any well-known type. The main controller is shown at K, reversing-switch at RS, and the brake-switch at BS. The brake-switch is really part of the controller K and is preferably mounted on the same cylinder. Suppose the brushes 14 to 21 of the reversing-switch RS bear upon the left-hand rows of contacts 14$^A$ to 21$^A$ and that the brushes 23 to 40 bear upon the line $l\ l$. The brushes 41 to 44 will then bear upon the line $l'\ l'$. Current then enters at the trolley or shoe T and passes to the brush 23 and thence to the contact 23$^a$, thence by cross connections to the contact 28$^a$ to the brush 28, and thence through the resistance R to the brush 34, contact 34$^a$, cross connection, contact 38$^a$, brush 38, brush 14 of the reversing-switch RS, brush 15, motor-armature $m'$, brush 16, contact 16$^a$, brush 17, brush 36 of the switch K, contact 36$^a$, cross connection, contact 37$^a$, brush 37, motor-field $m^2$, brush 44, contact 44$^a$, cross connection, contact 31$^a$, brush 31, brush 18 of reversing-switch RS, contact 18$^a$, brush 19, armature $m^3$, brush 20, contact 21$^a$, brush 21, brush 35 on switch K, contact 35$^a$, cross connection, contact 39$^a$, brush 39, to field-magnet $m^4$, and to ground. This obviously connects both motors in series with the resistance R. It will be noticed that in this position the brush 43 bears on the contact 43$^a$, which is cross-connected to contact 29$^a$, so that a circuit exists from the shoe T to 23 23$^a$ 28$^a$ 28 and to the common point between the resistance R and R$^3$, as before, thence through R$^3$ to 43 43$^a$ 29$^a$ 29 to the brakes $s$ $s'$ and to earth. This serves to pass a demagnetizing-current through the brake-shoe, where it is considered necessary, as set forth in an application of Frank E. Case, Serial No. 644,884, filed July 17, 1897. The connections are then as shown in diagram in Fig. 9. Further rotation of the controller K acts to open this demagnetizing-circuit and to cut out the resistance R.

4 4 is the full-series position. In passing from 4 4 to 5 5 one motor is shunted, as explained in connection with Fig. 5, and 5 5 to 8 8 are the multiple positions. The various brake positions are indicated by the lines 9, 10, 11, 12, 13, and 14. Suppose the brushes 23, &c., to rest upon the line 9 9, the circuit may be traced as follows, referring to Figs. 8 and 10 and starting at the ground connection: through the brakes $s'$ and $s$ to brush 29, contact 29$^b$, cross connection, contact 27$^a$, brush 41, resistance R, brush 34, to contact 34$^b$. Here the branch circuits begin, one through 35$^b$ and one through 36$^b$. Tracing the latter of these first, the upper one in Fig. 10 will pass to brush 36, brush 17 on reversing-switch RS, brush 16, through the armature of motor $m'$, to brush 15, brush 14, and brush 38 to contact 38$^b$. The set of contacts 37$^b$ to 40$^b$, inclusive, are connected together by a cross connection, which forms the equalizer-wire shown in Fig. 10. Returning to the contact 34$^b$ the second branch circuit, the lower one in Fig. 10, passes to 35$^b$, brush 35, brush 21 on reversing-switch RS, through the contact 21$^a$ to brush 20, to the motor-armature $m^3$, to brushes 18 and 17 on RS, to brush 40, and then to contact 40$^b$, the equalizer. Starting again at this equalizer, there are two branch circuits, one, the upper one in Fig. 10, by cross connection to the contact 37$^b$, through field $m^2$, to contact 32, to segment 32$^b$, by cross connection to segment 33$^b$, to contact 33, and to ground. The other circuit from the equalizer to ground leads by cross connection to contact 39$^b$, to brush 39, through field $m^4$, direct to the ground-wire. The effect of rotating the controller to the positions 10 11, &c., is to gradually cut out the resistance interposed in the circuit of the braking-generators and to add to the retarding effect.

The connection of the various controllers in multiple between the source of supply and ground enables me to employ cut-out switches CO, (see Fig. 4,) by which any one of the controllers may be cut out without affecting the operation of the others, so that in the event of any accident to a motor or controller on one car that car may still be employed in the train as a "trailer," the other car or cars furnishing the necessary motive power.

It will be seen that by my improved system I am able to control a train of cars for power and for brake with the same facility and positiveness available in the control of an ordinary single motor-car. I procure an even acceleration and an even braking effect without bumping, since each car is accelerated and retarded with the same force as that applied to all the other cars. I also avoid the necessity of placing air-brakes upon the train and render the whole control of the train, both for power and braking, purely electrical, or at least electrically controllable, and therefore capable of the most delicate and the most rapid action. I prefer to so adjust the motors B which drive the motor-controllers of the train that when current is freely admitted to them they will drive the controllers at the rate most suitable for the desired acceleration without danger to the machines, which rate I find to be such as to produce a constant current, not exceeding that at which the wheels will slip, in all the motors of the train. Obviously, if it is desired to accelerate the motors at less than maximum rate the motorman has simply to turn the master-controller slowly, so that a slow rotation of the master-controller will be followed by a slow rotation of the motor-controllers, while a rapid rotation of the master-controller will be followed by a corresponding rapid rotation of the motor-controllers up to and not beyond that speed of rotation which experience shows to be best for any particular installation. I do not, however, claim this feature of rendering the speed of the controller independent of the speed of rotation of the operating-handle, broadly, in this present application, since it forms the subject-matter of another application.

Though I have particularly described my invention in connection with electric-train systems, it should be understood that it is applicable to other uses.

What I claim as new, and desire to secure by Letters Patent of the United States, is—

1. A system of train control for an electric railway, comprising a number of motor-cars, each of which is provided with a controller for its motor, the controllers being in parallel between the source of supply and ground, step-by-step actuating devices for each controller, a circuit or circuits including the step-by-step actuators, and a regulator in the circuit or circuits governing the actuators.

2. In a system of train control for electric railways, a number of motor-cars provided with controllers governing the motors of the respective cars and connected in parallel between the source of supply and ground, step-by-step actuating devices for each controller, a regulator upon the train controlling all of the actuating devices simultaneously, and cut-outs for each actuator arranged to cut out any controller without affecting the operation of the others.

3. In a train system, the combination with a number of cars provided with separate controllers, of means controlled by said controllers for propelling said cars, and for positively retarding the motion of said cars, and means for simultaneously operating all the said controllers from a selected point.

4. In a train system, the combination with a number of cars provided with separate controllers, of means controlled by said controllers for propelling said cars, and for positively retarding the motion of said cars without absorbing power from the line, and means for simultaneously operating all the said controllers from a selected point.

5. In a train system, the combination with a plurality of motors or sets of motors, of a plurality of controllers each adapted to connect and regulate one set of motors for positively accelerating the train or for retarding it by acting as braking-generators, and means for simultaneously operating all the controllers from a selected point.

6. In a train-control system, the combination with a plurality of sets of brakes and motors, of a plurality of controllers, each adapted to regulate one set of brakes and motors, and means for simultaneously controlling the operation of all the controllers from a selected point.

7. In a train-control system, the combination with a plurality of brakes and motors, or sets of brakes and motors, of a plurality of controllers, each adapted to regulate one set of motors for power and braking purposes, and also to apply one set of brakes, and means for simultaneously operating all the controllers from a selected point.

8. In an electric-train system, the combination of a number of motor-cars, each provided with means for converting its motors into generators for braking the train, the motor-circuits of one car being independent of those of the adjacent car, and means situated at a selected point for controlling the action of all the braking-generators.

9. The combination in a train system of a plurality of motor-controllers each comprising a switch arranged to supply current to a plurality of motors, or to assist in retarding the train, and a reversing-switch, and means for controlling all of the said controllers from a distance.

10. In a train system, the combination with a plurality of motor-cars equipped with motors and controllers, of stops for limiting the movement of the controllers, and electromagnetic means for controlling the stops of a plurality of controllers from a single point.

11. In a train system, a plurality of motor-cars, each equipped with motors, a series parallel motor-controller and a master-controller, in combination with means for driving the motor-controllers in either direction, stops for limiting their movement, and means whereby any one of the master-controllers governs the stops of all of the motor-controllers.

12. In a train system, a plurality of motor-cars, each equipped with motors, a series parallel motor-controller, a contact device and a master-controller, in combination with means for driving the motor-controllers in either direction, stops for limiting their movement, and means whereby any one of the master-controllers governs the stops of all of the motor-controllers.

13. In a train system, the combination of a number of motor-cars united to form a train or a portion of a train, controllers for the motors, pilot-motors for actuating the controllers, means for returning the controllers to the initial position in case the source of supply fails, and one or more controllers, each capable of regulating the pilot-motors.

14. The combination in an electric-train system, of a number of controllers mounted on different cars, each adapted to connect the apparatus on one of the cars for accelerating or retarding, and electromagnetic means for controlling the operation of the said controllers from a distant point.

15. The combination with an electric car provided with a plurality of motors, of a controller adapted to connect the motors in series or in parallel, and adapted to retard the car by electromagnetic means, with electromagnetic means controllable from either one of a plurality of separate points, for actuating the controller.

16. In a system of train control, a plurality of motor-cars provided with motors and motor-controllers, in combination with one or more master-controllers, the arrangement being such that a movement of the master-controller in either the "on" or "off" direction, through any number of steps, causes a corresponding movement of all of the motor-controllers.

17. The combination with an electric car and its motors, of a controller adapted to connect the motors for acceleration by its rotation in one direction and to cause the retardation of the car, by its rotation in another direction, a spring or springs arranged to return the controller to a selected point, and electromagnetic means for moving the controller away from the said selected point.

18. The combination with a shaft, of means for actuating it in either direction, a set of stops for preventing movement in one direction, and a set of stops for preventing movement in the other direction, and means for withdrawing said stops.

19. The combination with a shaft, of means for actuating it in either direction, a plurality of stops arranged in pairs, one stop of each pair being so arranged as to be in while the other is out, and means for actuating said stops.

20. The combination with a shaft, of means for actuating it in either direction, stops arranged in pairs and so connected that while one stop is in, the other stop is out, and a solenoid acting against a spring for controlling the motion of the stops.

21. The combination with a shaft, of means for actuating the same, two sets of stops, and two catches, each arranged to pass freely by its respective set of stops while moving in one direction, and not while moving in the other direction.

22. The combination with a motor-controller, of a motor for driving the same, a master-controller for admitting current to the driving-motor, and a lost-motion connection in the master-controller, such that a slight motion of the master-controller arm in either direction causes a corresponding motion of the motor-controller.

23. The combination with a motor-controller of a motor for driving the same, and a master-controller so arranged that when it is thrown any amount in one direction, it admits current to the driving-motor, but cuts off current from the motor as soon as any movement is made in the other direction.

24. The combination with a motor-controller of a motor for driving the same, and a master-controller so arranged that when it is thrown any amount in one direction it admits current to the driving-motor and causes it to run an amount depending on the amount of the movement, but cuts off current from the motor as soon as any movement is made in the other direction.

In witness whereof I have hereunto set my hand this 15th day of March, 1898.

WILLIAM B. POTTER.

In presence of—
B. B. HULL,
C. L. HAYNES.